United States Patent
Jain

(10) Patent No.: US 12,366,977 B2
(45) Date of Patent: Jul. 22, 2025

(54) HOST-INDEPENDENT DISK OPTIMIZATION AND DATA OPERATIONS FOR USB-BASED STORAGE DEVICES

(71) Applicant: Sandisk Technologies, Inc., Milpitas, CA (US)

(72) Inventor: Nitin Jain, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 42 days.

(21) Appl. No.: 18/232,310

(22) Filed: Aug. 9, 2023

(65) Prior Publication Data
US 2024/0427501 A1 Dec. 26, 2024

Related U.S. Application Data

(60) Provisional application No. 63/522,692, filed on Jun. 22, 2023.

(51) Int. Cl.
G06F 12/00 (2006.01)
G06F 3/06 (2006.01)

(52) U.S. Cl.
CPC .......... *G06F 3/062* (2013.01); *G06F 3/0619* (2013.01); *G06F 3/0625* (2013.01); *G06F 3/064* (2013.01); *G06F 3/0679* (2013.01)

(58) Field of Classification Search
CPC ...... G06F 3/062; G06F 3/0619; G06F 3/0625; G06F 3/064; G06F 3/0679; G06F 3/061; G06F 12/0238; G06F 2212/7205; G06F 2212/7206; G06F 2212/7207; G06F 2212/7211
See application file for complete search history.

(56) References Cited

U.S. PATENT DOCUMENTS

| | | | |
|---|---|---|---|
| 8,191,120 B2 | 5/2012 | Baum et al. | |
| 2008/0114990 A1* | 5/2008 | Hilbert | G06F 12/1458 713/189 |
| 2010/0088464 A1* | 4/2010 | Yang | G06F 12/0246 711/E12.001 |
| 2012/0008272 A1 | 1/2012 | Lu et al. | |
| 2015/0289402 A1 | 10/2015 | Tang et al. | |
| 2015/0348642 A1 | 12/2015 | Ellis | |
| 2016/0204940 A1 | 7/2016 | Zachey | |
| 2018/0046421 A1 | 2/2018 | Mazurek | |

OTHER PUBLICATIONS

U.S. Appl. No. 18/232,305, filed Aug. 9, 2023.
U.S. Appl. No. 18/830,183, filed Sep. 10, 2024.

* cited by examiner

*Primary Examiner* — Shawn X Gu
(74) *Attorney, Agent, or Firm* — PATTERSON + SHERIDAN, LLP

(57) ABSTRACT

Systems and methods are disclosed for providing host-independent data operations. In certain embodiments, a data storage device includes a non-volatile memory; a pinhole button configured to be pressed; and a controller configured to: detect that the pinhole button is pressed; detect that the data storage device is coupled to a direct-current (DC) power supply; and initiate a disk operation for the data storage device. In some embodiments, the controller can be configured to initiate a data operation, such as an authentication or data accessibility operation, a data security operation, etc., for example, in addition to or instead of a disk operation.

20 Claims, 8 Drawing Sheets

HOST-INDEPENDENT DISK OPTIMIZATION AND DATA OPERATIONS FOR USB-BASED STORAGE DEVICES

CROSS-REFERENCE TO RELATED APPLICATION(S)

This application claims the benefit of U.S. Provisional Patent Application No. 63/522,692, filed Jun. 22, 2023, entitled "HOST-INDEPENDENT DISK OPTIMIZATION AND DATA OPERATIONS FOR USB-BASED STORAGE DEVICES," which is hereby expressly incorporated by reference herein in its entirety for all purposes.

BACKGROUND

Field

The present disclosure relates to data storage systems. In particular, the present disclosure relates to data operations of data storage devices.

Description of Related Art

Data storage devices can perform various data operations, including processing data requests from hosts. In some cases, data storage devices, such as Universal Serial Bus (USB) storage devices, can perform background operations, such as disk optimization and other data operations.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
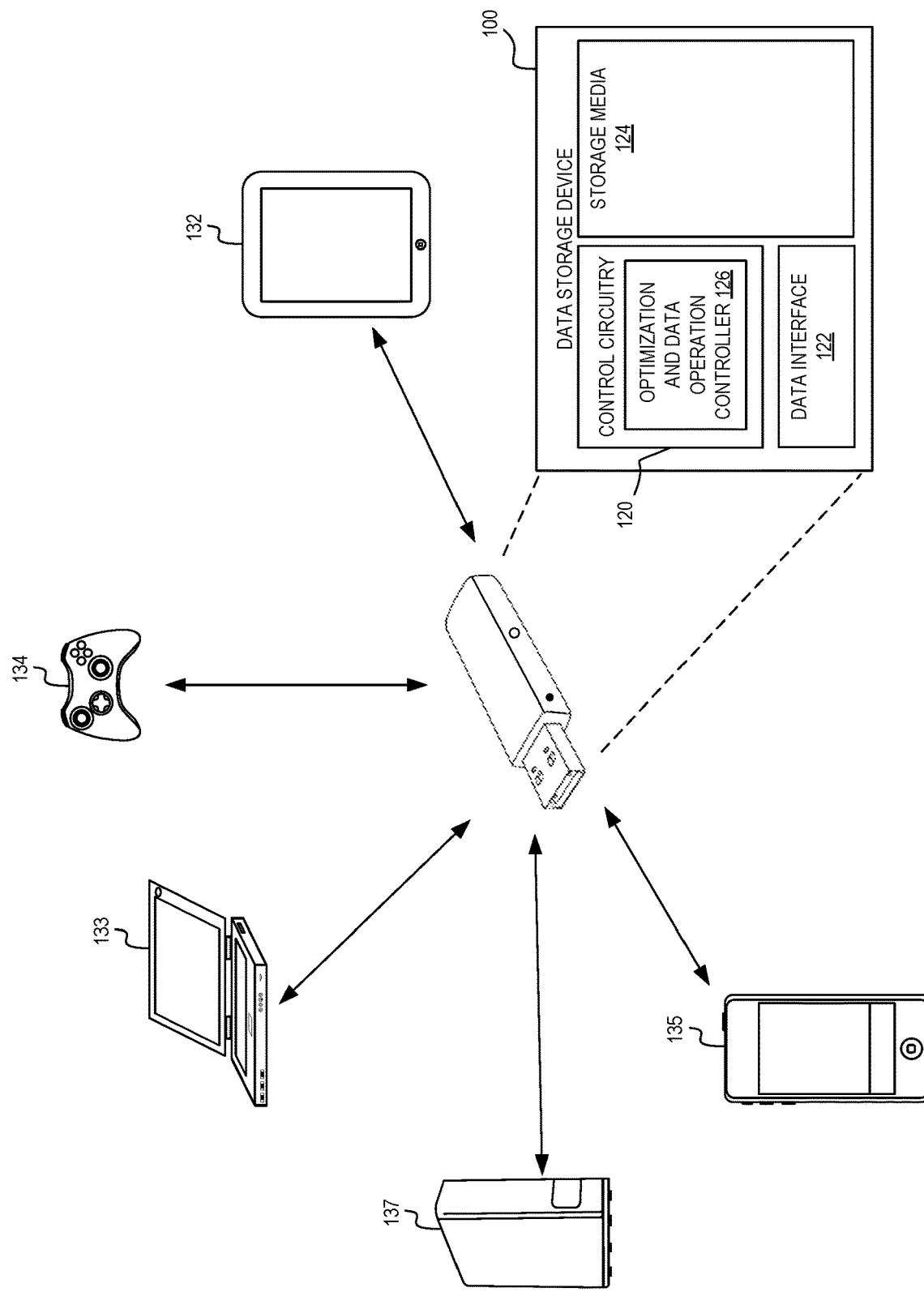
FIG. 1 illustrates an example data storage device relating to providing disk optimization and data operations, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Host-Independent Disk Optimization and Data Operations of USB-Based Storage Devices In many cases, storage devices can perform several background operations to maintain or improve functionality, endurance, and performance. Examples of storage devices can include portable storage devices, such as USB flash drives or other USB devices. For instance, background operations may be performed for a USB flash drive while the drive is connected to a host. Most of background operations in the drive can be interleaved with host operations (e.g., host input/output) of the host since the drive moves to a low power state when there are no host operations in order to save power drawn from the host. When the drive enters a low power state, many components including the host interface, the controller, and NAND dies are put in an inactive state, and internal background operations may not be performed in such inactive state. Background operations can include, but are not limited to, garbage collection, data folding, data compaction, memory health checks and data retention checks (e.g., read scrub), updating of management tables, etc. Having background operations interleaved with host operations can reduce performance since system resources are split and shared between host operations and background operations. Examples of system resources may include the controller, cores, central processing unit (CPU) cycles, flash interface manager (FIM), NAND, data bus bandwidth, internal memory available on system-on-chip (SoC), cache memory, temporary data memory buffers, etc.

In order to address these and other challenges, a storage device according to certain aspects can implement host-independent disk optimization and data operations. For instance, background operations of a storage device may be performed without being connected to a host and receiving power from a host and/or without instructions from a host, such as previously stored instructions. For example, a USB flash drive can include a pinhole button that can be pressed to initiate a disk optimization operation or another data operation. The drive can determine whether the drive is connected to a power supply, and if there is a sufficient power supply, the drive can initiate the disk optimization operation or another data operation when pressing of the pinhole button is detected. The USB flash drive can include an indicator, such as a light emitting diode (LED) indicator, that can show whether a disk optimization operation or another data operation is in progress or completed. A user may configure what functionality is associated with the pinhole button such that the configured functionality can be initiated when the pinhole button is pressed and the USB flash drive is connected to a power supply. In this way, various disk optimization or data operations can be performed without a host, and performance of the storage device can be improved during subsequent host operations when the storage device is connected to a host. Details relating to the storage device for providing host-independent disk optimization and data operations are provided below.

Data Storage Device

FIG. 1 is a diagram illustrating a data storage device 100 that provides host-independent disk optimization and data operations, according to certain embodiments. In some embodiments, the data storage device 100 includes control circuitry 120 for controlling the data storage device 100, a data interface 122, and non-volatile storage media 124. The control circuitry 120 can include hardware and/or software (e.g., firmware) for performing disk optimization and data operations on the storage media 124, such as an optimization and data operation controller 126. The optimization and data operation controller 126 may be implemented in firmware, which may be run on a controller chip. In some implementations, the optimization and data operation controller 126 may be a specialized, hardware-based chip for performing disk optimization and data operations. The control circuitry 120 can also include additional functionality. For example, the control circuitry 120 may support file-based storage. The control circuitry 120 can also include functionality for managing data transfers of the data storage device 100.

The data storage device 100 can employ a variety of storage technologies and/or form factors. For example, the data storage device 100 may be a solid-state drive (SSD), Secure Digital (SD) card, or a universal serial bus (USB) memory stick that uses semiconductor memory as the storage media 124. In other implementations, the data storage device 100 may be a hard disk drive (HDD) that uses magnetic disks as the storage media 124 or a solid-state hybrid drive (SSHD) that uses a combination of semiconductor memory and magnetic disk technology.

The storage media 124 can utilize various types of non-volatile memory (NVM) to permanently store data. NVM is a type of computer memory that can retain stored information even after power is removed. For example, the storage media 124 can include one or more magnetic disks and/or semiconductor memory. The semiconductor memory can include any of various memory technologies, such as NAND memory and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as ReRam, Phase-Change Memory (PCM), and Magnetoresistive Random-Access Memory (MRAM).

The data storage device 100 can include a small amount of volatile memory, such as random-access memory (RAM) to serve as a cache for data. Such a cache can enable very fast access to data stored on it. In some embodiments, the data storage device 100 can also include a secondary non-volatile memory, in addition to the storage media 124. For example, the data storage device 100 can also include read-only memory (ROM), where firmware may be stored, and/or complementary metal-oxide semiconductor (CMOS) memory, where firmware settings may be stored.

In some embodiments, the control circuitry 120 is configured to manage semiconductor memory or magnetic technology. For example, the control circuitry 120 may include a memory or storage controller. In some embodiments, the control circuitry 120 is configured to manage the data interface 122. For example, the control circuitry 120 may include a USB controller. The control circuitry 120 can include an embedded processor, electrically erasable firmware ROM, RAM, error correction code (ECC) circuitry, head controller, voice coil motor (VCM) controller, and/or a host electrical interface such as Serial ATA (SATA), USB, Non-Volatile Memory Express (NVMe), or Serial-Attached SCSI (SAS).

The data interface 122 can include connectors, cables, and/or protocols for connection, communication, and/or power supply between host devices and the data storage device 100. In some embodiments, a port of the data interface 122 can enable transfer of both data and power to connected devices. In some embodiments, the data interface 122 comprises USB hardware and/or software. Various versions of USB can be used, such as USB 2.x, USB 3.x, or USB 4.x. The data interface 122 can include a physical port for coupling with connectors and cables. Various types of USB ports can be included on the data storage device, such as male or female Type A, Type B, Type C, mini, and/or micro connectors. Other data interface standards can also be used, such as external SATA (eSATA), ExpressCard, FireWire (IEEE 1394), and Thunderbolt. The data interface 122 can include a port for connecting with a cable or a corresponding port on the host device.

In some embodiments, the data storage device 100 lacks a battery. Instead, the data storage device 100 receives power, via the data interface 122, from a connected host or via a wall adapter (e.g., USB charger, alternating current (AC) to direct current (DC) converter, etc.) that can connect to mains electric power in a building. A USB port on the host device can provide both power and serve as a conduit for data transmission. For example, the data storage device 100 may connect via the USB port to the host system, which typically provides 5 volts (V) of DC power, though fast charging USB ports may provide higher voltages of DC power.

Various types of host devices can connect to the data storage device 100. Such host devices can include phones 135, such as smartphones, electronic appliances (not shown), smart televisions (TV's) (not shown), video game devices 134, laptop computers 133, tablet computers 132, desktop computers (not shown), wearable computers (not shown), wall-powered storage devices 137 (e.g., network attached storage or powered external drive) and/or other consumer electronic devices.

The data storage device 100 may be communicatively coupled to a host device via the data interface 122. The data storage device 100 may provide additional data storage to connected devices or facilitate transfer of data to other host devices. The data storage device 100 may be connected to a physical connection port (e.g., USB) on the host device, either directly (e.g., male port to female port) or via a cable.

Host-Independent Disk Optimization and Data Operations

Figure 2:
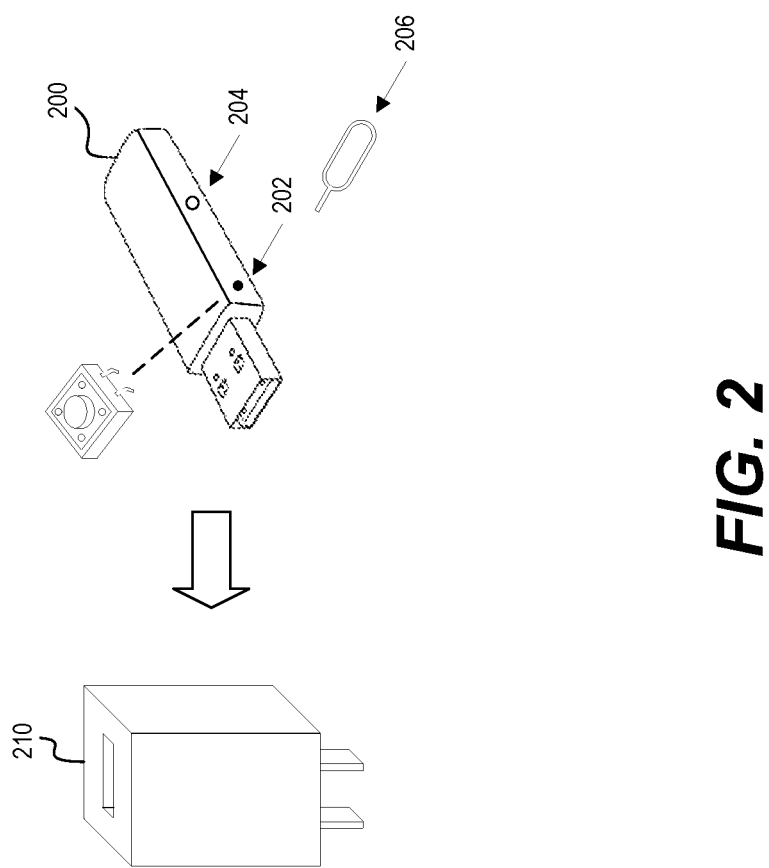
FIG. 2 is a block diagram illustrating an example data storage device for providing disk optimization and data operations and associated components, in accordance with one or more embodiments.

FIG. 2 illustrates an example data storage device 200 for providing host-independent disk optimization and data operations, in accordance with one or more embodiments. In some embodiments, components of FIG. 2 can be similar to components of FIG. 1 having similar names and/or reference numbers. For example, the data storage device 200 can be similar to the data storage device 100 in FIG. 1. Certain details relating to the data storage device 200 are described above in connection with FIG. 1.

As in the example of FIG. 2, the data storage device 200 can be a USB flash drive or memory stick. The storage device 200 can include a pinhole button 202. The pinhole button 202 can be pressed to initiate a disk optimization operation (or another data operation). For example, the pinhole button 202 can be pressed with a pin 206 that is provided by with the storage device 200. The pinhole button 202 can be pressed for a specified duration or threshold period in order to initiate a disk optimization operation (or another data operation). The storage device 200 can determine whether it is connected to a power supply 210 (e.g., DC power supply/adapter/power bank, etc.), and if the storage device 200 is connected to a power supply 210, a disk optimization operation can be initiated. Initiation of a disk optimization operation and performing the disk optimization operation do not require a connection to a host. The storage device 200 can stay connected to the power supply 210 while the disk optimization operation is performed. The storage device 200 can also include an indicator 204, such as an LED indicator. The indicator 204 can provide status information relating to a disk optimization operation. The indicator 204 can show whether a disk optimization operation is in progress or completed. For instance, the LED can be turned on when a disk optimization operation starts, stay on while the disk optimization operation is in progress, and turn off when the disk optimization operation is completed. After the disk optimization operation is completed, the storage device 200 may be disconnected from the power supply 210.

Various types of buttons or switches may be used to implement the pinhole button 202. Examples of buttons or switches can include push buttons, toggle buttons, momentary switches, etc. A push button can be pressed and stay in a pressed position (e.g., stuck). The push button can be pressed again and return to a normal position. A toggle button can be pressed and return to a normal position. When the push button or the toggle button is pressed, an interrupt or a command can be sent to a controller, and an associated functionality can be performed. Any suitable button or switch can be used. The pinhole button 202 can be placed inside the storage device 200 and pressed through the pinhole or aperture such that the button is not inadvertently pressed to trigger a disk optimization operation (or another data operation). As an example, the pinhole button 202 can be placed inside the lid set of a USB flash drive. The pinhole button 202 can be connected to a printed circuit board (PCB). In some embodiments, the pinhole button 202 may be placed on the exterior of the storage device 200.

A press effect of the pinhole button 202 can vary depending on the embodiment. For instance, the pinhole button 202 can be sticky or not sticky when pressed. If the press effect of the pinhole button 202 is sticky, an associated action or functionality cannot be undone or canceled by pressing the pinhole button 202 again. If the press effect of the pinhole button 202 is not sticky, an associated action or functionality may be undone or canceled by pressing the pinhole button 202 again. In some cases, the pinhole button 202 can be stuck to a pressed position to avoid resetting an associated functionality by mistake or to prevent misuse of the pinhole button 202.

The pinhole button 202 may be configured to perform various functionalities based on press duration or press count. For instance, a short press of the pinhole button 202 can be associated with a first functionality, and a long press of the pinhole button 202 can be associated with a second functionality. The short press and the long press can be defined to have a corresponding duration (e.g., a specified number of seconds, etc.). An appropriate number of durations can be defined and used depending on the number of functionalities available. For instance, if three functionalities are available, a short press, a medium press, and a long press may be defined. In some instances, press count can be associated with different functionalities or activating/deactivating a functionality. Multiple presses may be used to activate or deactivate a functionality. Double presses or triple presses may be used as appropriate. Many variations are possible.

The pinhole button 202 can be configured to function in various manners. As an example, if the pinhole button 202 is pressed in a powered-on state of the storage device 200, the pinhole button 202 can be back to a normal position, but can stop functioning for subsequent presses until performing the associated functionality is completed. In this way, errors resulting from further presses of the pinhole button 202 by a user can be prevented. As another example, if the pinhole button 202 is pressed in a powered-off state of the storage device 200, the pinhole button 202 can be stuck and remain in a pressed position. When the storage device 200 is powered on next time, the storage device 200 can check the button status of the pinhole button 202 and initiate an associated functionality. After initiating the associated functionality, the pinhole button 202 can be released to a normal position, but can stop functioning for subsequent presses until performing the associated functionality is completed. In some embodiments, further interrupts generated by pressing of the pinhole button 202 can be handled by the firmware, for example, by ignoring subsequent instructions after receiving an initial instruction.

To proceed with a disk optimization operation through pressing of the pinhole button 202, the storage device 200 can determine whether the storage device 200 is connected to a power supply 210 that can provide power to the storage device 200. As an example, the power supply 210 can be a 5V DC power supply (e.g., adapter). In some embodiments, the power supply 210 is a wall charger 210, such as a USB charger that includes a USB port for charging USB devices. Any appropriate power supply may be used. In some cases, a compliant battery or a rechargeable power bank can be used. In some embodiments, the power supply 210 can be an AC adapter. In certain embodiments, the storage device 200 may include a battery.

The storage device 200 may be coupled to a host for various data operations. For instance, a USB male port/connector of a USB storage device can be connected to a USB female port/connector of a host. USB storage devices can operate on 5V DC input current supplied via USB female ports of hosts. Examples of hosts can include a computer, a laptop, a mobile phone, etc. In some cases, a USB storage device may be coupled to a mobile phone via an On-The-Go (OTG) cable. A standard USB (type-A) port can have four (4) pins. Two (2) pins can be used for power, and two (2) pins can be used for data transfer. A description of the four pins is provided below in Table 1.

TABLE 1

Example USB Pin Descriptions

| Pin No. | Pin Name | Pin Description |
| --- | --- | --- |
| 1 | VCC | +5 V Power Pin |
| 2 | D− | Differential Pair D− of Data Pin |
| 3 | D+ | Differential Pair D+ of Data Pin |
| 4 | Ground | Connects to Ground of Host |

Figure 3A:
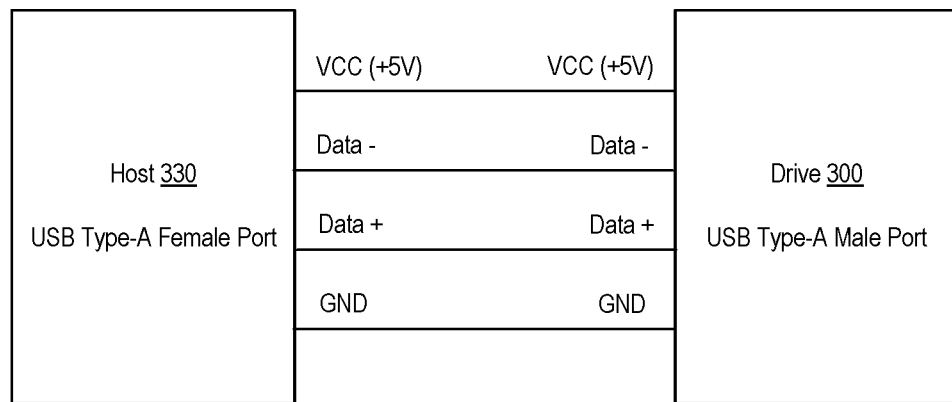
FIG. 3A shows a connection between a host and a USB storage device, in accordance with one or more embodiments.

FIG. 3A shows a connection between a host 330 and a USB storage device 300. The connection between the host 330 and the USB storage device 300 can utilize four pins, including two power pins (e.g., +5V power pin, ground pin) and two data pins (e.g., Data− and Data+ pins).

Figure 3B:
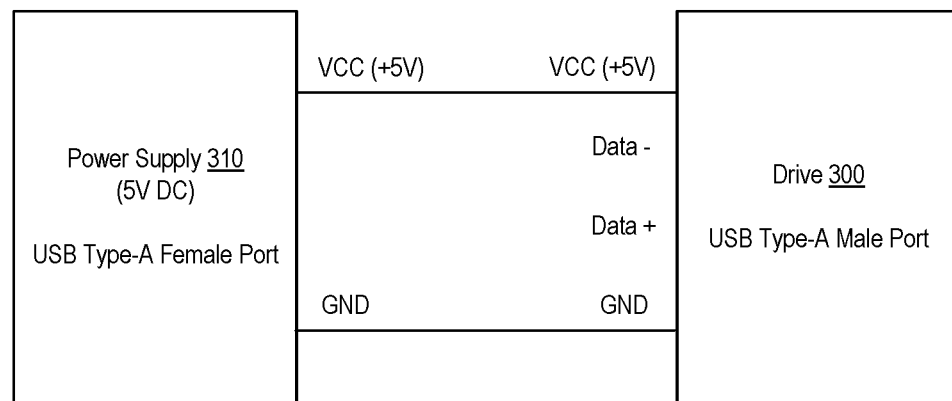
FIG. 3B shows a connection between a power supply and a USB storage device, in accordance with one or more embodiments.

The storage device 200 may also be coupled to a power supply 210, such as a wall charger. A 5V DC power supply/adapter can generally include power pins, but not include data pins. FIG. 3B shows a connection between a power supply (5V DC) 310 and a USB storage device 300. The connection between the power supply 310 and the USB storage device 300 can include two power pins (e.g., +5V power pin, ground pin). The storage device 200 can determine that the storage device 200 is connected to a power supply 210 and not a host when there is no data exchange happening.

The indicator 204 can provide status information relating to a disk optimization operation. The indicator 204 may use various methods to provide information relating to a disk optimization operation. For instance, the indicator 204 can be an LED indicator. As an example, the LED can be turned on while a disk optimization operation is performed and turned off when the disk optimization operation is completed. As another example, the LED can blink or use different colors to provide status information. The LED can use different blink rates or different colors to convey information. Various types of indicators may be used, for example, including one or more of LEDs, a screen, an electrochromic display, an electronic sound or speaker module, etc.

As described above, a user may configure what functionality should be associated with the pinhole button 202. In some embodiments, the pinhole button 202 can be associated with a disk optimization operation. In certain embodiments, the pinhole button 202 can be associated with other data operations, such as authentication, accessibility, data security operations, etc. Details relating to various disk optimization operations and data operations are provided below, for example, in connection with FIGS. 4-6. In some cases, a user may configure which functionality to associate with the pinhole button 202 by connecting to a host (e.g., using a host or mobile application). The user configured functionality can be performed when the pinhole button 202 is pressed at a subsequent time. In some embodiments, the user may disable the pinhole button 202 by not specifying a functionality associated with the pinhole button 202.

For illustrative purposes, host-independent disk optimization and data operations are described in connection with a USB flash drive, but host-independent disk optimization and data operations can be appliable to any type of data storage device. For instance, host-independent disk optimization and data operations can be applicable to any storage device that includes at least one USB interface. Examples of storage devices can include external or portable storage devices, such as a portable solid state drive (SSD) or a portable hard drive (HDD). Details relating to disk optimization and data operations are provided below, for example, in connection with FIGS. 4-6.

Figure 4:
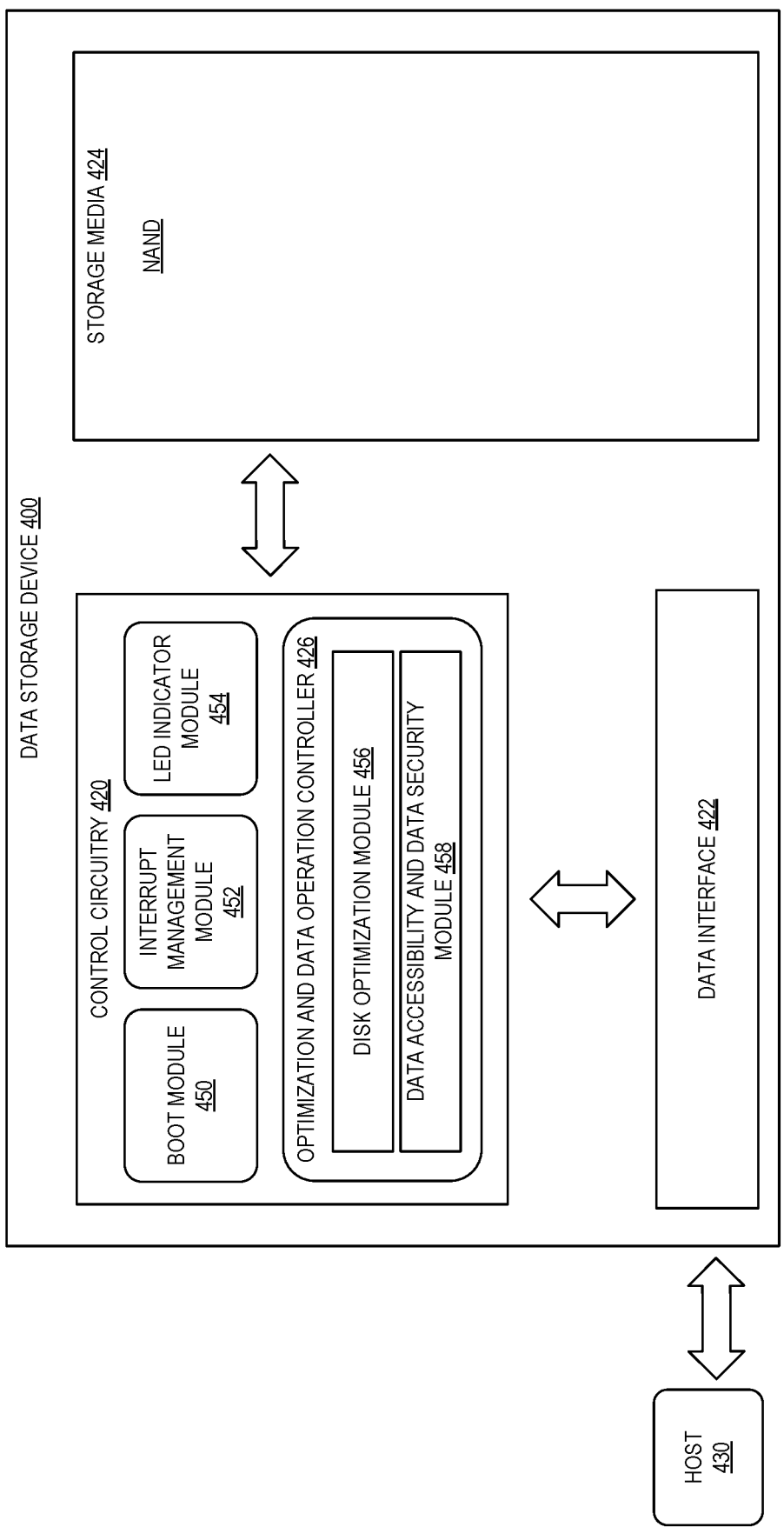
FIG. 4 is a block diagram illustrating an example data storage device for providing disk optimization and data operations, in accordance with one or more embodiments.

FIG. 4 is a block diagram illustrating an example data storage device 400 for providing host-independent disk optimization and data operations, in accordance with one or more embodiments. In some embodiments, components of FIG. 4 can be similar to components of FIGS. 1-2 having similar names and/or reference numbers. For example, the data storage device 400 can be similar to the data storage device 100, 200 in FIGS. 1-2. Certain details relating to the data storage device 400 are described above in connection with FIGS. 1-2.

The data storage device 400 can include control circuitry 420, a data interface 422, and storage media 424. The storage device 400 may connect to and communicate with a host 430 through the data interface 422. The control circuitry 420 can include a boot module 450, an interrupt management module 452, an LED indicator module 454, and an optimization and data operation controller 426. The boot module 450 can manage the booting process for the storage device 400. The boot module 450 may determine whether the storage device 400 is connected to a host 430 or a power supply. For example, the boot module 450 can determine that the storage device 400 is connected to a host 430 when there is data transfer or device discovery related message exchange, or device capability discovery related handshake. The boot module 450 can determine that the storage device 400 is connected to a power supply that is not a host when there is no data transfer or exchange or handshake. The interrupt management module 452 can manage interrupts associated with the storage device 400. Interrupts may be masked or temporarily disabled. For instance, the interrupt management module 452 can mask some or all interrupts while a disk optimization operation or another data operation is being performed. The interrupt management module 452 can unmask some or all interrupts after the disk optimization operation or another data operation is completed. The LED indicator module 454 can manage one or more LEDs. For example, the LED indicator module 454 can turn one or more LEDs on or off, have one or more LEDs blink, etc. in order to provide status information relating to the disk optimization operation or another data operation.

The optimization and data operation controller 426 can include a disk optimization module 456 and a data accessibility and data security module 458. The disk optimization module 456 can perform a disk optimization operation for the storage device 400. A disk optimization operation can include a performance and space optimization operation, a data compression/decompression optimization operation, a data retention optimization operation, etc. The disk optimization module 456 can be configured to perform one or more of a performance and space optimization operation, a data compression/decompression optimization operation, a memory health check, a data retention optimization operation, etc. The data accessibility and data security module 458 can perform a data accessibility operation or a data security operation for the storage device 400. For instance, a data accessibility operation can make a partition or a full storage device accessible or inaccessible or perform authentication. A data security operation can include data encryption/decryption. The data accessibility and data security module 458 can be configured to perform one or more of a data accessibility operation, a data security operation, etc. The storage media 424 can include NAND memory. NAND memory can be organized in one or more blocks. The storage device 400 and/or the control circuitry 420 may include additional or fewer components, depending on the embodiment. One or more components of the storage device 400 and/or the control circuitry 420 may be combined or implemented separately, depending on the embodiment.

Disk Optimization Process and Authentication and Data Security Process

Figure 5:
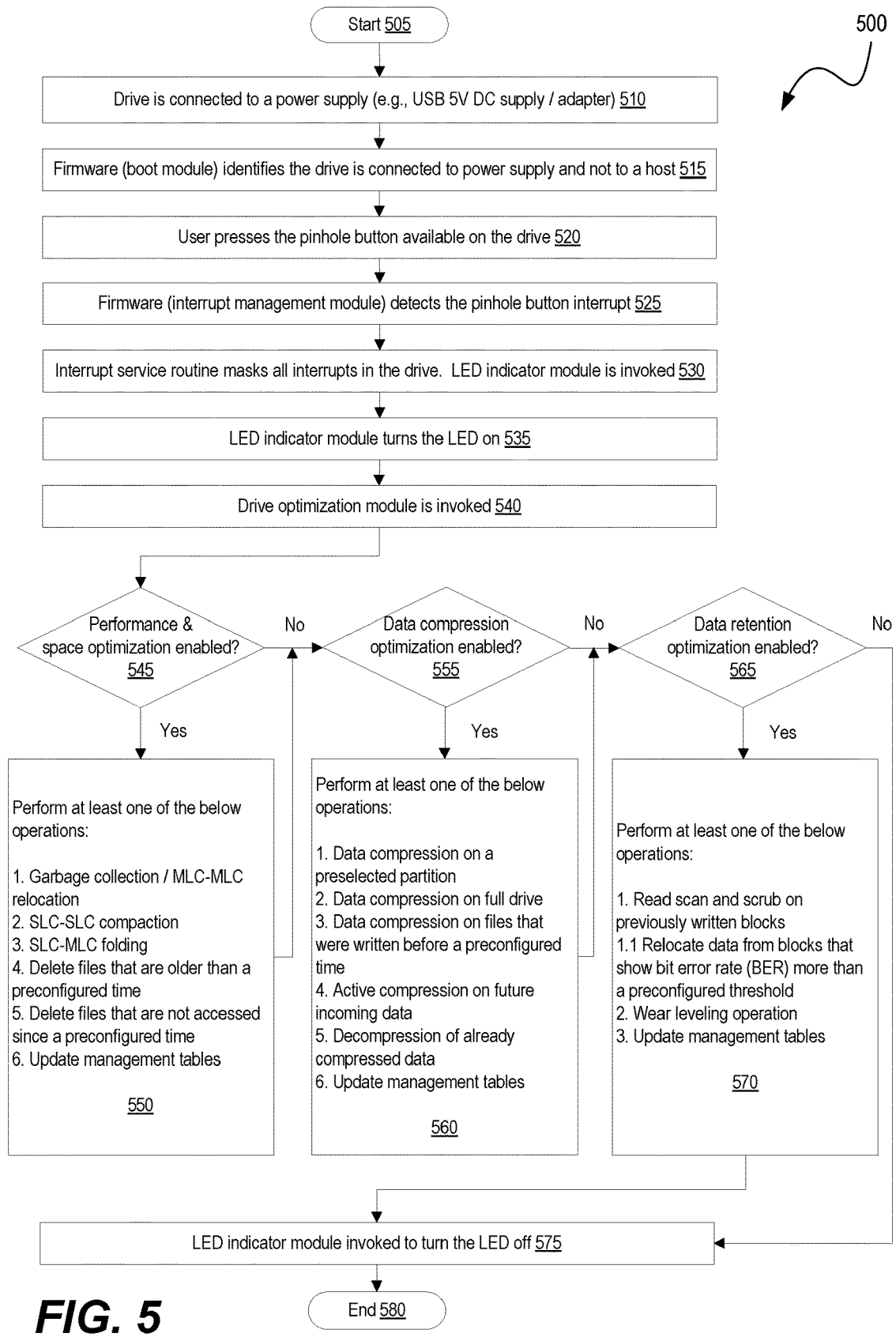
FIG. 5 illustrates a workflow process for providing disk optimization and data operations in a data storage device, in accordance with one or more embodiments.

FIG. 5 illustrates a workflow process 500 for providing disk optimization and data operations in a data storage device, in accordance with one or more embodiments. The workflow process 500 may be implemented by a data storage device, such as a data storage device 100, 200, 400 in FIGS. 1-4. For example, the workflow process 500 may be performed in part or in whole by a controller of a data storage device. For illustrative purposes, the process 500 is explained below in connection with the data storage device 400 in FIG. 4. Certain details relating to the process 500 are explained in more detail with respect to FIGS. 1-4. Depending on the embodiment, the process 500 may include fewer or additional blocks, and the blocks may be performed in an order that is different from illustrated.

The process 500 starts at block 505. At block 510, the data storage device 400 is connected to a power supply. For example, the power supply can be a USB 5V DC power supply/adapter. At block 515, the firmware (e.g., the boot module 450) can identify that the storage device 400 is connected to a power supply and not to a host. For example, the boot module 450 can be executed when the storage device 400 is connected to the power supply. The firmware can check whether the storage device 400 is connected to a host or a power supply, for example, based on a USB handshake protocol. If there is no data transfer or message exchange, the firmware can determine that the storage device 400 is connected to a power supply. At block 520, a user presses the pinhole button available on the storage device 400. At block 525, the firmware (e.g., the interrupt management module 452) can detect the pinhole button interrupt. At block 530, the interrupt service routine masks all interrupts in the storage device 400, and the LED indicator module 454 is invoked. At block 535, the LED indicator module 454 can turn on the LED. At block 540, the disk optimization module 456 is invoked.

At block 545, the storage device 400 determines whether performance and space optimization is enabled. If performance and space optimization is enabled at block 545, the process 500 proceeds to block 550. At block 550, the storage device 400 can perform at least one of the following operations: garbage collection/MLC-MLC relocation, SLC-SLC compaction, SLC-MLC folding, deleting all files that are older than a preconfigured time, deleting files that are not accessed since a preconfigured time, and updating management tables. If performance and space optimization is not enabled at block 545, the process 500 proceeds to block 555.

In some embodiments, one or more performance optimization and space retrieval related operations can be performed. For instance, the storage device 400 can check any blocks that are ready for garbage collection and/or MLC-MLC relocation and perform relocation. Data on the storage device 400 may be defragmented. MLC-to-MLC relocation can move data from one or more MLC blocks to another MLC block. The storage device 400 can check any blocks that are ready for compaction and perform compaction. Compaction can include both SLC block and MLC block compaction. For example, SLC-to-SLC compaction can include moving data from one or more SLC blocks to another SLC block. The storage device 400 can check any SLC blocks that are ready for folding into MLC blocks and perform folding. Data from one or more SLC blocks may be moved to an MLC block. The storage device 400 can delete data files that are older than a preconfigured time based on internal timestamps. The storage device 400 can delete data files that are not accessed since a preconfigured time based on internal timestamps. The storage device 400 can update management tables.

At block 555, the storage device 400 determines whether data compression optimization is enabled. If data compression optimization is enabled at block 555, the process 500 proceeds to block 560. At block 560, the storage device 400 can perform at least one of the following operations: data compression on a preselected partition, data compression on full drive, data compression on files that were written before a preconfigured time, active compression on future incoming data, decompression of already compressed data, and updating management tables. If data compression optimization is not enabled at block 555, the process 500 proceeds to block 565.

In some embodiments, one or more data compression operations can be performed. For instance, the storage device 400 can perform data compression on at least one partition present on the drive or on the full drive, for example, using a data compression utility available on the drive. Any suitable compression algorithm may be used. As an example, the storage device 400 can zip files to perform compression. The storage device 400 can perform file compression on files that are older than a preconfigured time based on internal timestamps. The storage device 400 can perform data decompression if data is already in a compressed form. The storage device 400 can activate compression of data that will be written on the drive subsequently.

At block 565, the storage device 400 determines whether data retention optimization is enabled. If data retention optimization is enabled at block 565, the process 500 proceeds to block 570. At block 570, the storage device 400 can perform at least one of the following operations: read scan and scrub on previously written blocks, relocating data from blocks that show bit error rate (BER) more than a preconfigured threshold, wear leveling operation, and updating management tables. If data retention optimization is not enabled at block 565, the process 500 proceeds to block 575. At block 575, the LED indicator module 454 is invoked to turn off the LED. All interrupts can be unmasked after the relevant operation is completed. The process 500 ends at block 580.

In some embodiments, one or more health/data retention related operations. In some cases, voltage may be depleted from NAND memory over time, and the storage device 400 can perform data retention related operations to improve data retention. For instance, the storage device 400 can perform read scrub on previously written blocks. The storage device 400 can move data from blocks that are showing higher read errors or bit error rate (BER) than a preconfigured threshold. The storage device 400 can also perform a wear leveling operation. A wear leveling algorithm can ensure that all blocks have same amount of program/erase (P/E) cycles. Cold data can be moved to blocks that have a high P/E count (e.g., hotter blocks).

Figure 6:
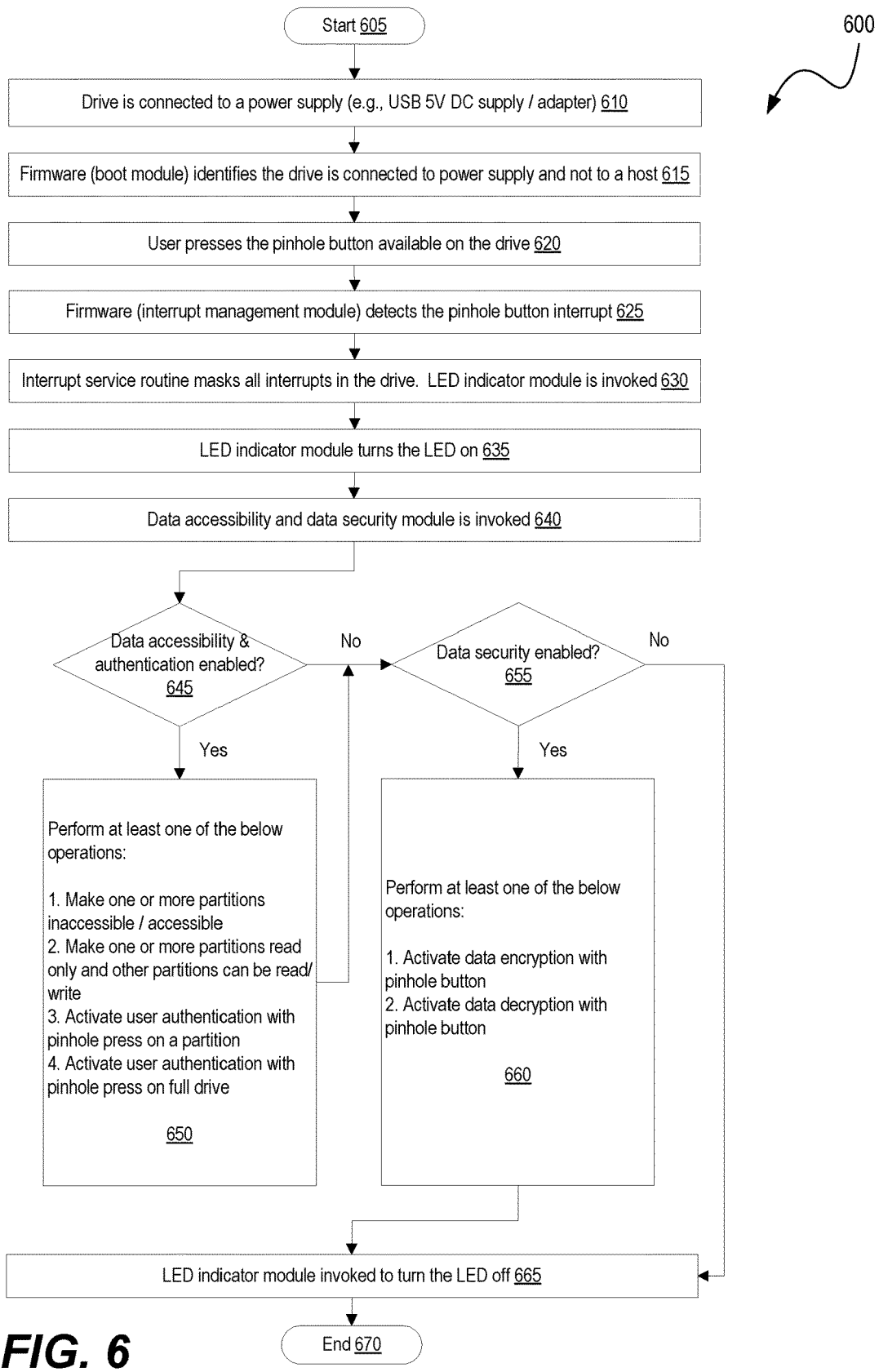
FIG. 6 illustrates a workflow process for providing host-independent data accessibility and data security operations in a data storage device, in accordance with one or more embodiments.

FIG. 6 illustrates a workflow process 600 for providing host-independent data accessibility and data security operations in a data storage device, in accordance with one or more embodiments. The workflow process 600 may be implemented by a data storage device, such as a data storage device 100, 200, 400 in FIGS. 1-5. For example, the workflow process 600 may be performed in part or in whole by a controller of a data storage device. For illustrative purposes, the process 600 is explained below in connection with the data storage device 400 in FIG. 4. Certain details relating to the process 600 are explained in more detail with respect to FIGS. 1-5. Depending on the embodiment, the process 600 may include fewer or additional blocks, and the blocks may be performed in an order that is different from illustrated.

The process 600 starts at block 605. At block 610, the data storage device 400 is connected to a power supply. For example, the power supply can be a USB 5V DC power supply/adapter. At block 615, the firmware (e.g., the boot module 450) can identify that the storage device 400 is connected to a power supply and not to a host. For example, the boot module 450 can be executed when the storage device 400 is connected to the power supply. The firmware can check whether the storage device 400 is connected to a host or a power supply, for example, based on a USB handshake protocol. If there is no data transfer or message exchange, the firmware can determine that the storage device 400 is connected to a power supply. At block 620, a user presses the pinhole button available on the storage device 400. At block 625, the firmware (e.g., the interrupt management module 452) can detect the pinhole button interrupt. At block 630, the interrupt service routine masks all interrupts in the storage device 400, and the LED indicator module 454 is invoked. At block 635, the LED indicator module 454 can turn on the LED. At block 640, the data accessibility and data security module 458 is invoked.

At block 645, the storage device 400 determines whether data accessibility and authentication are enabled. If data accessibility and authentication are enabled at block 645, the process 600 proceeds to block 650. At block 650, the storage device 400 can perform at least one of the following operations: making one or more partitions inaccessible/accessible, making one or more partitions read only and other partitions can be read/write, activating user authentication with pinhole press on a partition, and activating user authentication with pinhole press on full drive. If data accessibility and authentication are not enabled at block 645, the process 600 proceeds to block 655.

In some embodiments, one or more data accessibility and/or authentication related operations can be performed. Authentication can include password protection. For instance, the storage device 400 can make a partition marked as private inaccessible or hidden. One or more partitions may be marked as private partitions by a user using a host application (e.g., an operating system (OS) or a mobile app). The storage device 400 can make one or more partitions read only and other partitions read/write. Instead of making a private partition inaccessible, the storage device 400 can make the private partition read only. The storage device can 400 can activate user authentication on a partition. Instead of making a private partition inaccessible, the storage device 400 can make the private partition password protected. The storage device 400 can activate user authentication on the full drive. The drive can be password protected and be a secured drive.

At block 655, the storage device 400 determines whether data security is enabled. If data security is enabled at block 655, the process 600 proceeds to block 660. At block 660, the storage device 400 can perform at least one of the following operations: activating data encryption with pinhole button and deactivating data encryption with pinhole button. If data security is not enabled at block 655, the process 600 proceeds to block 665. At block 665, the LED indicator module 454 is invoked to turn off the LED. All interrupts can be unmasked after the relevant operation is completed. The process 600 ends at block 670.

In some embodiments, one or more data security related operations can be performed. For instance, the storage device 400 can perform data encryption on all content or on a preconfigured partition. In this way, the storage device 400 can be a secured data drive or a self-encrypting drive. If data is already encrypted, the storage device 400 can perform decryption. In some cases, the storage device 400 can perform encryption on newly written data after the pinhole button is pressed, and old data can remain unencrypted.

As described above, a user can configure usage of the pinhole button for various purposes, including but not limited to accessibility, data encryption, data compression/decompression, space management, performance management, etc. In some embodiments, the pinhole button can be configured to initiate a data backup operation. For instance, data can be backed up on preconfigured cloud storage, Internet-enabled devices, Wi-Fi connected devices, etc. In certain embodiments, an OS layer or a file system or similar features can be available on the storage device to perform some of the above described functionalities or operations. For example, an OS layer, a file system, or similar features may be provided to manage timestamps for files/updates, compression algorithm details, encryption keys, passwords, etc.

Storage devices by providing host-independent disk optimization and data operations can improve performance of storage devices by performing background and other data operations without a connection to a host and/or with reduced dependency on a host. A storage device can be connected to a power supply, and a specified operation can be initiated by pressing a pinhole on the storage device. A user can configure using a host at a previous time which data operation should be initiated by pressing of the pinhole button. Or a default data operation can be associated with pressing of the pinhole button. Performing background or other data operations on the storage device while not being connected to a host can improve performance of the storage device when the storage device is subsequently connected to a host. For example, when the storage device is subsequently connected to the host, there can be no or fewer pending background or other data operations, such that host operations can be performed without utilizing resources for background or other data operations. Host operations do not need to be interleaved with background or other data operations. In addition, more storage can be available when the storage device is subsequently connected to a host due to data relocation, compaction, folding, etc. Host-independent disk optimization and data operations can reduce or eliminate host dependency in performing background operations and/or other data operations for the storage device. Examples described herein are provided for illustrative purposes, and many variations are possible. Features described in connection with various embodiments and/or examples may be implemented separately or in combination.

Figure 7:
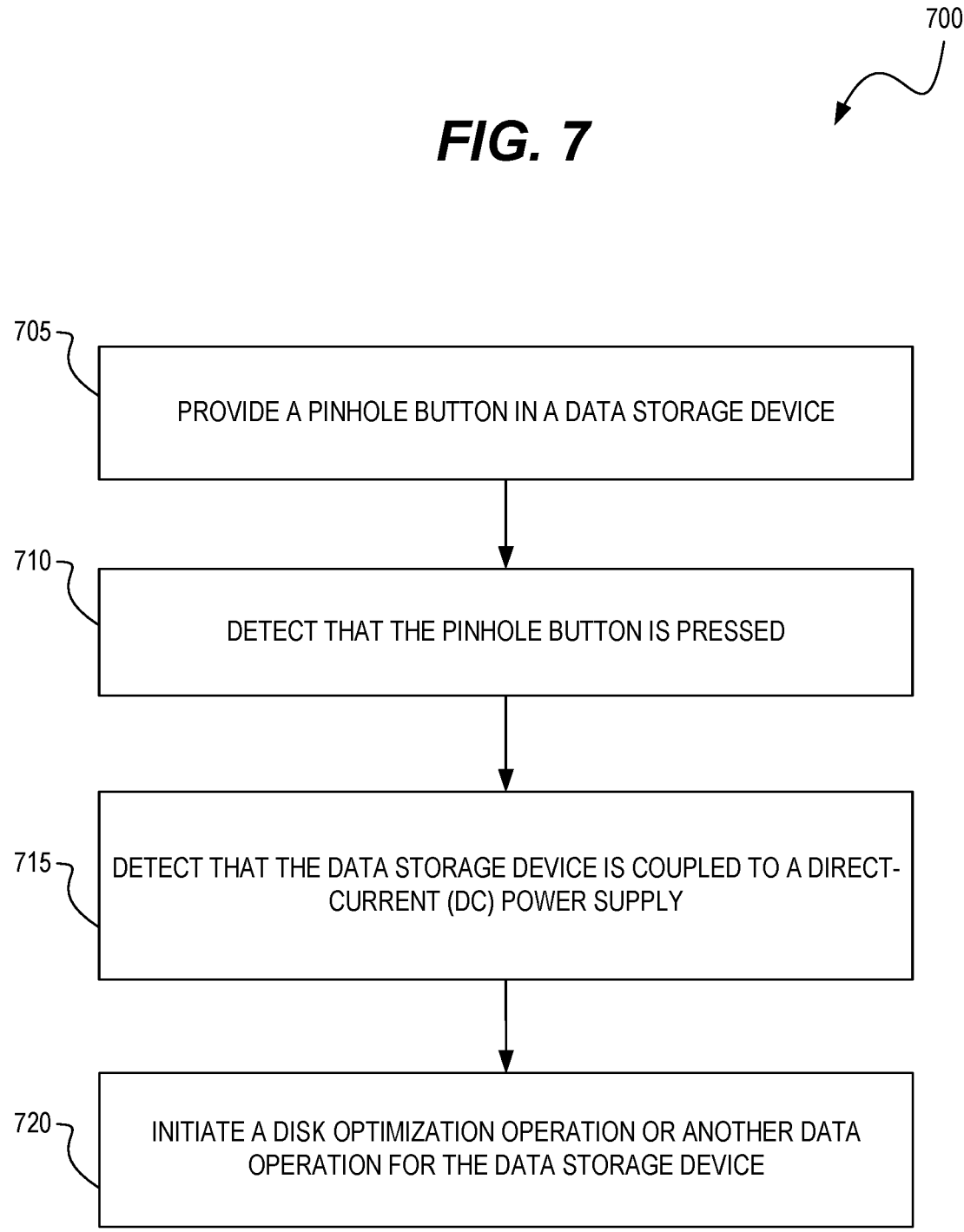
FIG. 7 illustrates a workflow process for providing disk optimization and data operations in a data storage device, in accordance with one or more embodiments.

FIG. 7 illustrates a workflow process 700 for providing host-independent disk optimization and data operations in a data storage device, in accordance with one or more embodiments. The workflow process 700 may be implemented by a data storage device, such as a data storage device 100, 200, 400 in FIGS. 1-6. For example, the workflow process 700 may be performed in part or in whole by a controller of a data storage device. For illustrative purposes, the process 700 is explained below in connection with the data storage device 200 in FIG. 2. Certain details relating to the process 700 are explained in more detail with respect to FIGS. 1-6. Depending on the embodiment, the process 700 may include fewer or additional blocks, and the blocks may be performed in an order that is different from illustrated.

At block 705, the data storage device 200 can provide a pinhole button 202 in the data storage device 200. For example, the pinhole button 202 can be pressed by a user to initiate a disk optimization operation or another data operation. In some embodiments, the data storage device 200 can include a pin 206 for pressing the pinhole button 202. The data storage device 200 can include a Universal Serial Bus (USB) interface. The data storage device 200 can include a light-emitting diode (LED) indicator 204 for providing status information relating to the disk optimization operation or another data operation. The data storage device 200 can turn on the LED indicator 204 in response to initiating the disk optimization operation or another data operation. The data storage device 200 can turn off the LED indicator 204 in response to completing the disk optimization operation or another data operation.

At block 710, the data storage device 200 can detect that the pinhole button 202 is pressed. In some embodiments, the data storage device 200 can detect that the pinhole button is pressed by receiving an interrupt, and the data storage device 200 can mask all interrupts to initiate the disk optimization operation or another data operation.

At block 715, the data storage device 200 can detect that the data storage device 200 is coupled to a direct-current (DC) power supply 210. The DC power supply 210 can include one or more of: a wall charger, a power bank, or a rechargeable battery.

At block 720, the data storage device 200 can initiate a disk optimization operation or another data operation for the data storage device 200. According to certain aspects, the data storage device 200 does not receive a command from a host to initiate the disk optimization operation or another data operation. According to certain aspects, the data storage device 200 is not connected to a host during the disk optimization operation or another data operation. In some embodiments, the disk optimization operation includes a performance and space optimization operation. The performance and space optimization operation can include one or more of: garbage collection, Multi Level Cell (MLC)-MLC relocation, Single Level Cell (SLC)-SLC compaction, SLC-MLC folding, deleting files older than a specified time, deleting files not accessed since a specified time, or updating management tables. In certain embodiments, the disk optimization operation includes a data compression optimization operation. The data compression optimization operation can include one or more of: data compression on a selected partition, data compression on full data, data compression on files written before a specified time, data compression on incoming data, decompression of previously compressed data, or updating management tables. In some embodiments, the disk optimization operation includes a data retention optimization operation. The data retention optimization operation can include one or more of: read scan and scrub on previously written blocks, relocating data from blocks that show a bit error rate (BER) more than a specified threshold, wear leveling operation, or updating management tables.

In some embodiments, the data storage device 200 can initiate an authentication or data accessibility operation. The authentication or data accessibility operation can include one or more of: making one or more partitions inaccessible or accessible, making one or more partitions read only and other partitions read/write, activating user authentication on a partition, and activating user authentication on the data storage device. In certain embodiments, the data storage device 200 can initiate a data security operation. The data security operation can include one or more of: activating data encryption, or deactivating data encryption.

Figure 8:
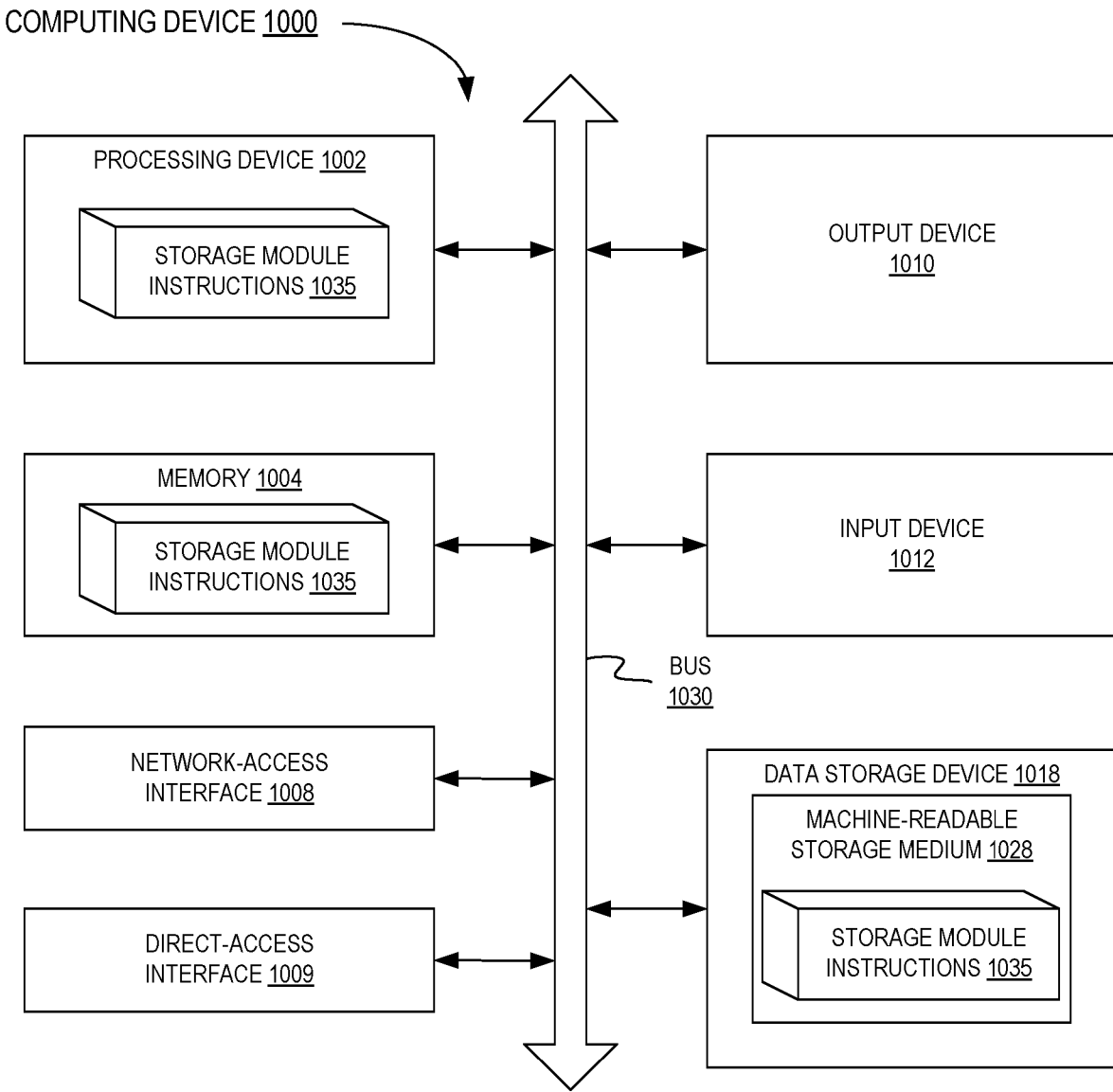
FIG. 8 is a diagram of a computing device, in accordance with one or more embodiments.

FIG. 8 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device 1002 (e.g., a processor, a controller, a central processing unit (CPU), etc.), a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network. The computing device may also include a direct-access interface 1009 (e.g., a USB interface, an external Serial Advanced Technology Attachment (eSATA) interface, a Thunderbolt interface, etc.). The computing device 1000 also may include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
a non-volatile memory;
a pinhole button configured to be pressed; and
a controller configured to:
detect that the pinhole button is pressed, wherein pressing the pinhole button initiates a disk optimization operation for the data storage device;
detect that the data storage device is coupled to a direct-current (DC) power supply;
detect whether there is data exchange between the data storage device and a host;
determine the data storage device is not coupled to a host, wherein the determination is based on detecting there is no data exchange; and
initiate the disk optimization operation for the data storage device when there is no data exchange detected and the data storage device is coupled to the DC power supply.

2. The data storage device of claim 1, wherein the data storage device includes a Universal Serial Bus (USB) interface.

3. The data storage device of claim 1, wherein the disk optimization operation includes a performance and space optimization operation.

4. The data storage device of claim 3, wherein the performance and space optimization operation includes one or more of: garbage collection, Multi Level Cell (MLC)-MLC relocation, Single Level Cell (SLC)-SLC compaction, SLC-MLC folding, deleting files older than a specified time, deleting files not accessed since a specified time, or updating management tables.

5. The data storage device of claim 1, wherein the disk optimization operation includes a data compression optimization operation.

6. The data storage device of claim 5, wherein the data compression optimization operation includes one or more of: data compression on a selected partition, data compression on full data, data compression on files written before a specified time, data compression on incoming data, decompression of previously compressed data, or updating management tables.

7. The data storage device of claim 1, wherein the disk optimization operation includes a data retention optimization operation.

8. The data storage device of claim 7, wherein the data retention optimization operation includes one or more of: read scan and scrub on previously written blocks, relocating data from blocks that show a bit error rate (BER) more than a specified threshold, wear leveling operation, or updating management tables.

9. The data storage device of claim 1, wherein the DC power supply includes one or more of: a wall charger, a power bank, or a rechargeable battery.

10. The data storage device of claim 1, wherein the data storage device does not receive a command from a host to initiate the disk optimization operation.

11. The data storage device of claim 1, wherein the data storage device is not connected to a host during the disk optimization operation.

12. The data storage device of claim 1, further comprising a light-emitting diode (LED) indicator for providing status information relating to the disk optimization operation.

13. The data storage device of claim 12, wherein the controller is further configured to:
turn on the LED indicator in response to initiating the disk optimization operation; and
turn off the LED indicator in response to completing the disk optimization operation.

14. The data storage device of claim 1, wherein the controller is further configured to:
detect that the pinhole button is pressed by receiving an interrupt; and
mask all interrupts to initiate the disk optimization operation.

15. The data storage device of claim 1, wherein the controller is further configured to initiate an authentication or data accessibility operation.

16. The data storage device of claim 15, wherein the authentication or data accessibility operation includes one or more of: making one or more partitions inaccessible or accessible, making one or more partitions read only and other partitions read/write, activating user authentication on a partition, and activating user authentication on the data storage device.

17. The data storage device of claim 1, wherein the controller is further configured to initiate a data security operation.

18. The data storage device of claim 17, wherein the data security operation includes one or more of: activating data encryption, or deactivating data encryption.

19. A method of performing a disk optimization operation in a data storage device, the method comprising:
providing the data storage device including a non-volatile memory and a pinhole button configured to be pressed;
detecting that the pinhole button is pressed, wherein pressing the pinhole button initiates the disk optimization operation for the data storage device;
detecting that the data storage device is coupled to a direct-current (DC) power supply;
detecting whether there is data exchange between the data storage device and a host;
determining the data storage device is not coupled to a host, wherein the determination is based on detecting there is no data exchange; and
initiating the disk optimization operation for the data storage device when there is no data exchange detected and the data storage device is coupled to the DC power supply.

20. A data storage device comprising:
a non-volatile memory;
a pinhole button configured to be pressed; and
a controller means configured to:
associate a first press pattern of a plurality of press patterns of the pinhole button with a first disk optimization operation of a plurality of disk optimization operations for the data storage device, wherein a press pattern of a plurality of press patterns includes a press count or a press duration of the pinhole button;
associate a second press pattern of the plurality of press patterns of the pinhole button with a second disk optimization operation of a plurality of disk optimization operations for the data storage device,
detect that the pinhole button is pressed in accordance with either the first press pattern or the second press pattern of the plurality of press patterns;
detect that the data storage device is coupled to a direct-current (DC) power supply;
initiate the corresponding disk optimization operation for the data storage device associated with the detected press pattern; and
disable the pinhole button until the initiated disk optimization operation is completed.

* * * * *